March 28, 1950 — E. E. SENSEL ET AL — 2,501,695
METHOD OF CATALYTICALLY SYNTHESIZING HYDROCARBONS
Filed Oct. 1, 1946
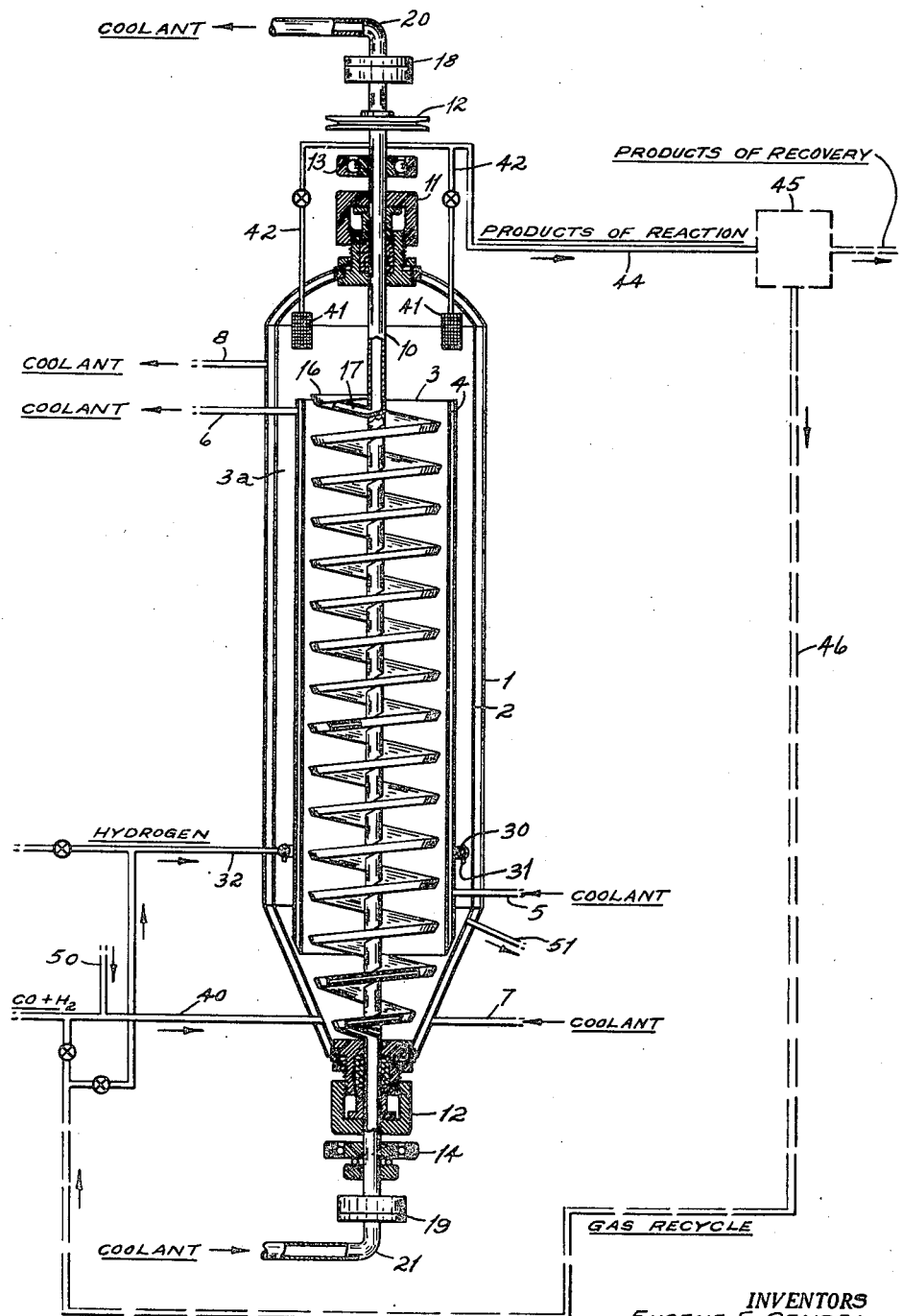
INVENTORS
EUGENE E. SENSEL
ROLAND A. BECK
BY Daniel Stryker
ATTORNEY Patented Mar. 28, 1950

2,501,695

UNITED STATES PATENT OFFICE 2,501,695

METHOD OF CATALYTICALLY SYNTHESIZING HYDROCARBONS

Eugene E. Sensel, Beacon, and Roland A. Beck, Fishkill, N. Y., assignors to The Texas Company, New York, N. Y., a corporation of Delaware Application October 1, 1946, Serial No. 700,508

5 Claims. (Cl. 260—449.6)

The present invention relates to the catalytic synthesis of hydrocarbons and oxygenated hydrocarbons by the reduction of carbon monoxide with hydrogen, and is more particularly concerned with effecting contact between the reactants and the catalyst under controlled reaction conditions.

Of the previously proposed contact systems, the use of the familiar technique of fluidization offers numerous advantages. As is known, following such procedure, the catalyst, usually in finely powdered form, is aerated usually by an up-flowing stream of the reactants uniformly distributed throughout the horizontal cross section of the reactor and moving at such a linear rate that the individual particles of the powder are in effect buoyed up or suspended for random ebullient movement. Among the advantages of this arrangement, the reactant gases make good predetermined contact with all of the available surfaces of each catalyst particle and contact accordingly occurs for a predetermined time period under predetermined conditions. Moreover, in the state of dense phase fluidization, for example, the catalyst mass has thermal properties analogous to those of a liquid of good heat conductivity, and therefore in the case of exothermic reactions such as the aforementioned hydrocarbon synthesis reaction, reaction temperatures may be held within the extremely narrow range which is usually found to be optimum.

The ideal state of fluidization, however, is frequently incapable of being maintained in the hydrocarbon synthesis reaction where certain practical limitations prevent the maintenance of those physical conditions necessary for good dense phase fluidization. The facility with which a catalyst is fluidized is dependent upon such factors as the density of the catalytic material and the size and shape of the particles, all of which affect its settling rate in an upflow of gas. The desired catalyst may accordingly possess a settling rate which is insufficient to permit fluidization of the contact mass in the reaction zone at the selected rate of reactant flow. Moreover, the synthesis reaction in question involves a volume reduction which makes it difficult to maintain preselected linear velocities of gas flow within the reactor. In addition to this, the contact mass, for reasons not fully understood at the present time, frequently experiences an internal change suggestive of a change in density, as a result of which fluidization is lost.

It is an object of the present invention, therefore, to provide a process for the synthesis of hydrocarbons wherein the reaction is carried out under a typical condition of catalyst fluidization, irrespective of the rate of flow of the reactant gases, and under such conditions that contact is effected uniformly.

Another object contemplates a process, as above, wherein the reaction is effected at gas velocities which would ordinarily be insufficient to maintain a uniform condition of fluidization within the reaction zone.

Another object of the invention contemplates operation of the foregoing process with the catalyst in contact with extended and adequate heat transfer surfaces operative to maintain the reaction temperature uniform within a desirably narrow range.

In accordance with the present invention, a synthesis gas comprising essentially carbon monoxide and hydrogen is converted directly into hydrocarbon compounds of higher molecular weight by passage in contact with a conventional synthesis catalyst at a velocity insufficient to fluidize the catalyst mass, but with the catalyst itself aerated by a substantial degree of mechanical agitation.

More specifically, the catalyst in the particulate or finely divided form and disposed within a suitable reaction chamber, is agitated by mechanical means in such manner that the mass is preferably violently stirred up until the powder occupies a volume substantially greater than its normal settled volume. In other words, mechanical agitation takes place in such a manner that the powder is in effect aerated to a condition of apparent density, less than its normal settled density, as a result of which the reactants pass relatively freely therethrough and at rates of flow insufficient, per se, to promote fluidization.

Advantageously, the agitating means is such as to tend to propel the catalyst upwardly under such conditions that it may gravitate downwardly at a predetermined rate throughout the stream of reactants. However, any system of agitation may be employed which will result in the mechanical aerating effect described and the consequent expansion of the apparent catalyst volume.

One form of apparatus suitable for carrying out the principles of the present invention is disclosed more particularly in the figure of the accompanying drawing. Reference is made to our copending application, Serial No. 700,507 filed of even date herewith, containing claims to the specific apparatus per se.

In the figure, numeral 1 designates a vessel having a hollow wall providing a space 2 through which a cooling fluid may circulate.

The numeral 3 designates a cylindrical vessel, supported by supports not shown, within the vessel 1. The vessel 3 is also constructed with a hollow wall to provide a space 4 through which cooling fluid may circulate. As indicated the vessel 3 is of smaller diameter than the vessel 1 so that an annular space 3a is provided between the exterior wall surface of the inner vessel 3 and the inner wall surface of the outer vessel 1. Pipe connections 5 and 6 provide means for introducing cooling fluid to and removing such fluid from the jacket space 4. Similar pipe connections 7 and 8 provide means for introducing cooling fluid to and removing it from the jacket space 2 of the outer vessel 1.

The numeral 10 designates a shaft axially supported within the concentric vessels. The upper and lower extremities of the shaft 10 extend through stuffing boxes 11 and 12 respectively, which boxes are provided in the upper and lower extremities respectively of the vessel 1. The shaft 10 is capable of rotation within the stuffing boxes which latter provide against leakage of fluids and also catalyst from the interior of the vessel.

Bearings 13 and 14 provide stationary bearing surfaces for the shaft 10 and in which it rotates, rotation being effected by rotation of a pulley or gear 15 integrally attached to a portion of the shaft extending outside the vessel 1. The bearing surfaces are adapted to oppose lateral and vertical thrust.

The portion of the shaft 10 extending through the inner vessel 3 is provided with a hollow helix 16 which is also made integral with the shaft. The hollow space of the helix 16 is indicated by the numeral 17, which hollow space at the upper end of the helix is in fluid communication with the interior and hollow end of the shaft 10. The interior of the hollow helix at its lower end is also in fluid communication with the hollow interior of the lower extremity of the shaft 10.

The upper and lower ends of the shaft 10 terminate in couplings 18 and 19 respectively, which are shown in an elevation view. These couplings are each formed of two sections, namely, a rotating section and a fixed section. The rotating sections are rigidly attached to the upper and lower ends of the shaft 10. During rotation of the shaft 10, these rotating sections form a sliding and leak-proof joint with their companion fixed sections of the couplings 18 and 19 which are of the stuffing box variety.

The fixed sections are rigidly attached to pipes 20 and 21 respectively.

As indicated in the drawing, the lower portion of the vessel 1 is of conical construction, and the bottom rim of the inner vessel 3 approaches the inner conical wall of vessel 1 sufficiently to provide a restricted circular space through which the solid catalyst in particle form may descend as will be mentioned later.

The lower end of the helix 16 is also tapered so as to conform to the interior of the conical bottom of the vessel 1.

The peripheral and under edge of the helix is beveled at an angle of about 30° from the adjacent inner wall of the vessel 3 thereby forming a knife-like edge adjacent the inner wall of the reaction zone. The clearance between the knife-like edge of the helix and the inner wall of the reaction vessel varies with the size of the reactor and the rate at which it is desired to have powdered catalyst gravitate towards the lower portion of the reaction zone. Although this may be varied depending upon such factors as the diameter of the helix, it has been found that this tapered edge of the helix is advantageous from the standpoint of preventing catalyst particles from jamming or lodging between the peripheral edge of the helix and the adjacent wall surface of the reactor.

While not indicated in the drawing, the flights of the helix may have small tubular ports extending therethrough to provide perforations through which gaseous reactants may rise.

The numeral 30 designates a ring distributor positioned within the annular space between the inner and outer vessels, the ring being provided with a plurality of ports or nozzles 31 projecting from the ring. A pipe 32 communicates with the ring 30 through which gaseous fluid may be introduced as will be described.

Synthesis gas comprising hydrogen and carbon monoxide usually in the molar ratio of about 2:1, preheated if necessary to any suitable temperature, is conducted from a source, not shown, through a pipe 40 and introduced near the bottom of vessel 1. The introduced gaseous reactants rise along or through the flights of the rotating helix in contact with the catalyst powder which is being lifted upwardly through the reaction zone by the rotating helix. There is thus a concurrent flow of catalyst and reactants upwardly through the vessel 3, during which flow conversion of reactants takes place to form the desired products of reaction.

In effect the helix, upon initiation of its rotation, appears to carry catalyst upwardly in an agitated, aerated mass with a continual highly aerated portion of the catalyst occupying the space between the periphery of the helix and the adjacent inner wall surface of the vessel 4. The helix may be rotated at from about 100 to about 2,000 R. P. M., for example, and the gaseous reactants may be introduced at a sufficient rate to flow through the reaction zone at a space velocity ranging from 100 to 5,000 cubic feet per hour per cubic foot of reactor space.

The unreacted gas and products of reaction containing some entrained catalyst powder rise into the top of the vessel 1 above the vessel 3. The gases and vapors are caused to flow through filters 41 which may be constructed of porous alundum or other porous material adapted to permit passage of gases and effect removal of suspended solids, the removed solids thus remaining within the reaction vessel. The gases and vapors flow from the filters 41 through pipes 42 to a common discharge pipe 44 which may lead to suitable product recovery means indicated by the block 45.

Provision may be made for separating unreacted gases or constituents thereof from the products of reaction and recycling them through a conduits 46 to the previously mentioned pipe 40.

Since the synthesis reaction is highly exothermic, it is necessary to dissipate the heat of reaction and this is accomplished by circulating a cooling liquid such as water or an organic compound such as diphenyl through the cooling jackets surrounding the inner and outer vessels and through the hollow helix. The cooling liquid for the helix may be introduced through the pipe 21 which communicates through the coupling 19 with the lower end of the helix. This liquid then flows through the interior of each flight of the helix and is discharged therefrom into the upper end of the hollow shaft 10 from which it flows through the coupling 18 and the pipe 20.

The catalyst powder rising to the top of the inner vessel 3 spills over into the annular space 3a and moves downwardly therethrough countercurrently to a rising stream of stripping gas. This stripping gas, for example hydrogen, is introduced through the pipe 32 into the distributing ring 30 from which it is discharged into the annular space. The stripping gas thus effects desorption of hydrocarbons and other products of reaction which are adsorbed by the catalyst during its passage upwardly through the vessel 3.

Catalyst powder may be added to the reactor through pipe 50 and pipe 40, through which it is forced by the feed gas. Used catalyst may be drawn off through a pipe 51. Provision, not shown, may be made for continuously drawing off a small amount of used catalyst through pipe 51, reactivating it, and recycling it to the reactor through pipe 50.

With more particular reference to the details of the reaction carried out in the reactor, the reactant mixture of hydrogen and carbon monoxide is converted into hydrocarbons, oxygenated hydrocarbons, and the like, with any familiar catalyst for this reaction at an elevated temperature and under elevated pressure or not. The conventional catalyst for this reaction, as is known, usually comprises a metal of the iron group, such as iron, nickel, cobalt or ruthenium, each operative at a known characteristic temperature range. Preferably a catalyst of the iron type is used at a temperature in the range of 500–650° F. and at elevated pressure. More specifically, the catalyst may comprise particles of powdered iron with about 4% alumina and about 0.1 to 2% of potassium oxide suitably preconditioned by treatment with synthesis gas until a condition of settled operation has been reached. The catalyst particle size may range, for instance, from about 60 to 325 mesh or finer. The active catalytic material may either be in the form of individual particles, as above, or else supported on a suitable carrier such as silica gel, diatomaceous earth, or the like. The catalyst may incorporate any of the typical activators or promoters, such as the oxides of thorium, uranium, calcium, magnesium, vanadium, etc.

Stated as a general proposition, the present invention is substantially independent of these typical conditions of reaction; that is to say, the present process is susceptible of being carried out with conventional particulate catalysts under the optimum conditions of temperature, pressure and the like hitherto accepted in the art.

In accordance with one specific example, a tubular reaction zone is provided with a mass of iron catalyst having a particle size of about 100 mesh. The catalyst referred to consists of metallic iron containing about 4% alumina and about 1% potassium oxide. The lower portion of a rotatable helix of the type disclosed in the attached drawing is immersed in the catalyst. With the helix at rest, the powder in the settled condition forms a bed about 6 inches deep. The helix is set into rotation at the rate of about 300 R. P. M. and the catalyst immediately rises in the tube to a distance of about 20 inches in a good, apparently uniform state of aeration. A mixture of hydrogen and carbon monoxide in the molar ratio of substantially 2:1 is introduced into the bottom portion of the mass at a temperature of about 600° F. and an inlet space velocity of about 500 volumes of gas per volume of catalyst per hour equivalent to a linear velocity of 0.04 ft. per second. The effluent gases are removed from the top of the vessel above the top level of the catalyst, condensed and separated, and the hydrocarbon products recovered with conversion equal to about 160 grams of liquid hydrocarbon per cubic meter of synthesis gas.

The rate of reactant gas feed may be varied within a wide range without affecting the results achieved. Particularly, the inlet feed can be decreased as far as desired without impairing operation. It is particularly important to note that the rate of gas flow mentioned in the foregoing example is insufficient to cause fluidization of the catalyst particles in the event rotation of the helix is stopped. In other words, a materially greater gas flow of the order of 1 foot per second would be necessary to cause a reasonable state of good dense phase fluidization under such conditions.

As will be apparent from a consideration of the foregoing example, the invention does not require the provision of an external catalyst recirculation and stripping zone, which accordingly may be omitted where stripping is otherwise provided for. With such an arrangement, the catalyst may, as indicated, be agitated and impelled upwardly to any suitable vertical level in the reaction chamber, dependent upon the rate at which the helix is rotated, the pitch of the helical member, and the like. Obviously, the spacing between the periphery of the helix and the adjacent wall surface may also be of some significance in determining the rate at which the powdered material may gravitate toward the lower portion of the reaction zone. In any event, a condition of fluidization and aeration is mechanically set up so that the reactants contact catalytic surfaces under a condition of fluidization even at normally low rates of flow.

It will be apparent from the foregoing that the present invention, in addition to the foregoing advantages, overcomes such typical irregularities in operation as the familiar "slugging" whereby slugs of catalyst and/or gases tend to be projected upwardly through the mass under relatively poor conditions of contact. In short, a predetermined condition of catalyst aeration is maintained mechanically and the reactants passed through the thus aerated powder. Aeration is accordingly relatively independent of the rate of gas flow. For this reason, it is possible to react carbon monoxide and hydrogen in the formation of familiar hydrocarbon products under the optimum conditions of temperature, pressure, contact time and the like, in contrast with previous processes wherein the advantages of fluidization could only be obtained under conditions of gas flow which involved a material compromise with optimum reaction conditions.

It is thought important to point out that the present invention has a significant practical advantage in permitting the addition of volatile liquid fractions directly to the catalyst at relative rates of feed which would hitherto have been considered impractical. Thus it has been proposed to add water or oils to the fluidized catalyst mass for the purpose of taking advantage of the latent heat of vaporization in controlling reaction temperature, as well as for making various required chemical additions to the catalyst and particularly for utilizing the high temperature reaction zone to crack hydrocarbons, particularly the heavier hydrocarbon liquids resulting from the synthesis process itself. Such practice, however, introduces the possible hazard of excessively wetting the catalyst at a point where the liquid stream is introduced. When this happens, the catalyst particles tend to adhere or agglomerate as a sort of mud which may interfere with fluidization to such an extent as to impair the operation of the process. In accordance with the present invention, however, a much greater proportion of such liquids may be introduced with the fresh feed without "mudding" the catalyst. The mechanically agitated and aerated mass apparently distributes the liquid so rapidly and completely throughout the mass that volatilization takes place with extreme rapidity and without permitting a localized concentration of liquid.

While hydrogen has been above referred to as the stripping medium, other gases may be used, including recycle gas derived from the end products of the reaction. Such recycle gas may be enriched with hydrogen. Preferably when following this embodiment, the velocity at which the stripping gas rises through the annular space 3a is maintained sufficiently low so as not to entrain descending catalyst to any substantial extent. Stripping gas after rising through the annular space 3a mingles with the products of reaction and is removed from the reaction zone.

It is to be understood that the invention described herein contemplates the synthesis of either hydrocarbons, oxygenated hydrocarbons or mixtures thereof which are the conventional products of the broad process. The specific pressure and temperature conditions most favorable for each type of product form no part of the present invention and are well known in the art.

Broadly the term "hydrocarbon" as used herein is intended to include those oxygenated compounds resulting from the catalytic reduction of carbon monoxide and hydrogen.

Obviously, many modifications and variations of the invention as hereinbefore set forth may be made without departing from the spirit and scope thereof and only such limitations should be imposed as are indicated in the following claims.

We claim:

1. In the process of catalytically converting hydrogen and carbon monoxide into hydrocarbons and the like wherein a stream of the reactant gases is caused to flow upwardly through a reaction zone in contact with a mass of hydrocarbon synthesis catalyst in the form of a dispersed, fluid phase of solid particles occupying a substantially greater volume than the settled volume of such particles such that the reactants pass upwardly about the individual particles on all sides thereof, the improvement which comprises effecting said contact at low reactant flow velocity without appreciable entrainment of catalyst in the effluent product stream withdrawn from the reaction zone, by passing said reactant stream upwardly through the reaction zone at a regulated rate insufficient to fluidize said solid particles of catalyst, continuously subjecting the catalyst particles in a localized vertical section of said reaction zone to a mechanical impelling action effective to project catalyst particles upwardly to a predetermined level, simultaneously permitting upwardly projected catalyst particles to settle downwardly about the region of said upward impelling action as a gravitating fluid phase within the upflowing reactant stream in the reaction zone and under conditions such that adjacet margins of the gravitating fluid phase are continuously subjected to the influence of said upwardly impelling action, regulating the force of the upward impelling action to cause the fluid phase to rise to a predetermined level such that substantially all of the upwardly projected catalyst particles gravitate downwardly adjacent the upwardly impelling influence, effecting substantial conversion of the reactants into desired hydrocarbons during passage in contact with the catalyst, withdrawing effluent products of reaction from the upper surface of the said fluid phase substantially free from entrained products and separating desired products of reaction from the effluent stream.

2. The process according to claim 1 wherein the temperature within the reaction zone is maintained at a predetermined level by continuously subjecting the said fluid phase to direct contact within the reaction zone with cooling surfaces subjected to regulated temperature control by an internal flow of cooling liquid in indirect exchange relationship with said catalyst particles.

3. The process according to claim 1 wherein the upward mechanical impelling action is effected centrally of the reaction zone and wherein gravitation occurs about the peripheral portions thereof in the reaction zone.

4. The method according to claim 1 wherein the catalyst comprises iron containing particles from about 60 to 325 mesh, and the reaction zone is continuously maintained at an elevated pressure, and a temperature of about 650° F.

5. In the process of catalytically converting hydrogen and carbon monoxide into hydrocarbons and the like wherein a stream of the reactant gases is caused to flow upwardly through a reaction zone in contact with a mass of hydrocarbon synthesis catalyst in the form of a dispersed, fluid phase of solid particles occupying a substantially greater volume than the settled volume of such particles such that the reactants pass upwardly about the individual particles on all sides thereof, the improvement which comprises effecting said contact at low reactant flow velocity without appreciable entrainment of catalyst in the effluent product stream withdrawn from the reaction zone, by passing said reactant stream upwardly through the reaction zone at a regulated rate insufficient to fluidize said solid particles of catalyst, continuously subjecting catalyst particles in a localized region of the reaction zone to an upward, mechanical impelling action effective continuously to project catalyst particles upwardly to a predetermined level in the reaction zone, simultaneously permitting downward, fluid phase gravitation of the upwardly impelled particles through the upflowing stream of reactants in the reaction zone, maintaining free access of the downwardly gravitating fluid phase to the region of upward projection such that the fluid phase particles are free to move at random into the influence of said upwardly impelling action, regulating the force of the upward impelling action such that the rate of upward projection substantially equals the rate of downward gravitation in the reaction zone without overall upward flow of catalyst particles, effecting substantial conversion of reactants during passage in contact with said catalyst, withdrawing effluent products of reaction from the upper surface of said fluid phase substantially free from entrainment of catalyst particles, and separating desired products of reaction from the effluent stream.

EUGENE E. SENSEL.
ROLAND A. BECK.

REFERENCES CITED

The following references are of record in the file of this patent:

UNITED STATES PATENTS

| Number | Name | Date |
|---|---|---|
| 1,984,380 | Odell | Dec. 18, 1934 |
| 2,309,034 | Barr | Jan. 19, 1943 |
| 2,353,600 | Sweetser | July 11, 1944 |
| 2,360,787 | Murphree et al. | Oct. 17, 1944 |
| 2,393,909 | Johnson | Jan. 29, 1946 |
| 2,419,088 | Putney | Apr. 15, 1947 |
| 2,419,097 | Stratford et al. | Apr. 15, 1947 |

FOREIGN PATENTS

| Number | Country | Date |
|---|---|---|
| 533,037 | Germany | Sept. 8, 1931 |